May 28, 1940.　　　P. WEIR　　　2,202,508
GRADING MACHINE
Filed Oct. 10, 1936　　10 Sheets-Sheet 1

INVENTOR
*Perry Weir*
BY *Carroll R. Taber*
ATTORNEY

May 28, 1940. P. WEIR 2,202,508
GRADING MACHINE
Filed Oct. 10, 1936 10 Sheets-Sheet 4

INVENTOR
*Perry Weir.*
BY *Carroll R. Taber*
ATTORNEY

May 28, 1940.   P. WEIR   2,202,508
GRADING MACHINE
Filed Oct. 10, 1936   10 Sheets-Sheet 5

INVENTOR
*Perry Weir*
BY *Carroll R. Taber*
ATTORNEY

May 28, 1940.  P. WEIR  2,202,508

GRADING MACHINE

Filed Oct. 10, 1936   10 Sheets-Sheet 7

FIG. 7.

INVENTOR
*Perry Weir.*
BY
*Carroll R. Taber*
ATTORNEY

May 28, 1940. P. WEIR 2,202,508
GRADING MACHINE
Filed Oct. 10, 1936 10 Sheets-Sheet 8

INVENTOR
Perry Weir.
BY
Carroll R. Taber
ATTORNEY

May 28, 1940.   P. WEIR   2,202,508
GRADING MACHINE
Filed Oct. 10, 1936   10 Sheets-Sheet 9

INVENTOR
Perry Weir.
BY
Carroll R. Taber
ATTORNEY

May 28, 1940. P. WEIR 2,202,508
GRADING MACHINE
Filed Oct. 10, 1936 10 Sheets-Sheet 10

INVENTOR.
Perry Weir.
BY
Carroll R. Taber
ATTORNEY.

Patented May 28, 1940

2,202,508

UNITED STATES PATENT OFFICE 2,202,508

GRADING MACHINE

Perry Weir, Frankfort, Mich., assignor, by mesne assignments, to Cherry Growers, Inc., Traverse City, Mich., a corporation of Michigan Application October 10, 1936, Serial No. 104,969

12 Claims. (Cl. 209—102)

This invention relates to article grading machines, and more particularly to a machine of that character suitable for grading fruits, such as cherries, and the like.

The principal object of the present invention is to provide a machine of the character mentioned above which may be operated continuously at a relatively high speed so that a large volume of fruit may be graded in a short period of time. Among the other objects of the invention are the provision of a novel grading section which may be readily adjusted to grade different sizes, and a general arrangement of parts permitting the machines to be used in tandem to effect a segregation of the fruit into various grades by passing the fruit from one machine to an adjacent machine. Other objects more or less incidental and ancillary to the foregoing will appear from the following detailed description of the machine taken in connection with the accompanying drawings, wherein—

The machine shown in the accompanying drawings is especially adapted for the grading of cherries. The detailed description of the machine will be prefaced with a brief outline of the function and arrangement of the several parts thereof. Referring particularly to Figures 1 to 6, inclusive, the machine includes a grading section indicated by the letter A, a feed belt section indicated by the letter B, a discharge hopper for the graded fruit indicated by the letter C, a discharge hopper for the cull fruit indicated by the letter D, a cull conveyor for the cull fruit indicated by the letter E, a by-pass section for by-passing the ungraded fruit over the grading section indicated by the letter F, a sprinkler system for washing the fruit as it passes over the grading section indicated by the letter G, and the power drive for the machine indicated by the letter H.

Fruit is delivered to the feed belt section B in any suitable manner by an elevator or the like, and is delivered from the feed belt section to the grading section A, so as to distribute the fruit laterally over the grading section. In the grading section the smaller fruit is separated from the larger fruit, the small or cull fruit falling into the cull hopper D from whence it is discharged onto the cull conveyor E. The graded fruit is carried by the grading section to the discharge hopper C from whence it is delivered to any suitable receptacle or conveyor belt utilized in transmitting the graded fruit to machines for performing other operations upon the fruit, such as cooking, packing, or the like.

The cull conveyor E is arranged so that the fruit delivered thereto may be transferred to the feed belt of an adjacent machine for a further grading operation. That is to say, the machine embodying the present invention is especially designed for operation in tandem whereby to effect segregation of fruit into a plurality of different grades.

Likewise, the machine is adapted for use as a unit in continuous grading, cooking and packing operations. To avoid a discontinuance of the operation just described in case anything goes wrong with the grading section of the machine, provision is made for by-passing the fruit over the grading section and discharging the same from the discharge hopper C normally used for the graded fruit. This is accomplished by the by-pass section indicated at F.

The sprinkler system G is arranged to discharge water upon the fruit as it is carried along the grading section whereby to clean the fruit.

The power drive indicated at H is of suitable character to provide for the drive of the different units of the machine at varying speeds whereby to synchronize the action of the several units to produce proper coaction and cooperation between the several units.

The present invention resides in the particular construction and arrangement of the several principal parts and in some instances in the detailed construction and arrangement of individual parts within the principal units just described.

For the sake of clarity and convenient reference the detailed description of the machine will be divided into the following several chapters:
1. The supporting frame
2. The grading section
3. The delivery and by-pass sections
4. The cull hopper and conveyor sections
5. The power drive

The supporting frame

Figure 1:
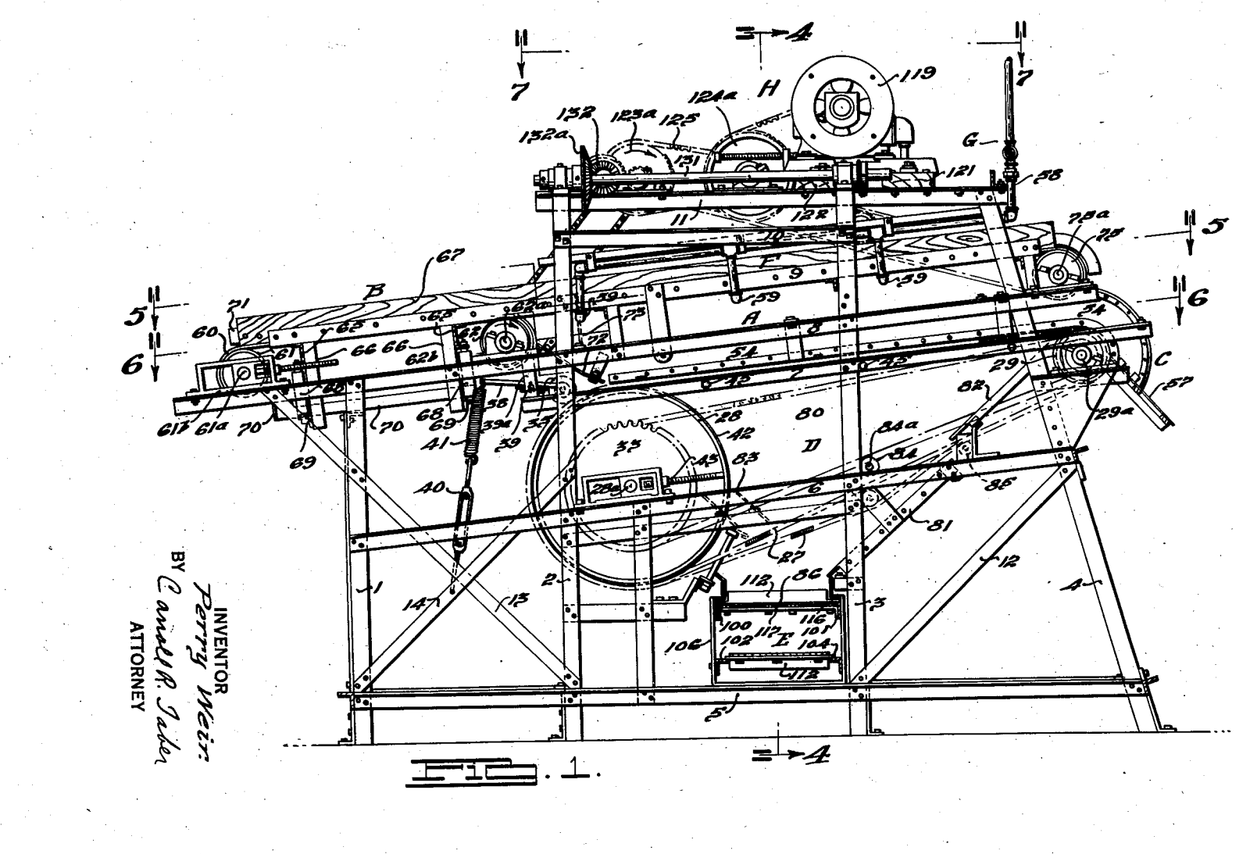
Figure 1 is a side view in elevation of a grading machine embodying the present invention.

The frame is constructed substantially throughout from conventional sections of angle iron. The frame includes four vertical members on each side, those on the side of the machine illustrated in Figure 1 being designated by the numerals 1, 2, 3, 4; those on the opposite side of the machine being designated by the numerals 1a, 2a, 3a, and 4a. Throughout the description of the frame the parts on the side shown in Figure 1 are designated by a numeral without a letter sufix and the corresponding parts on the opposite side of the machine are designated by the same number with the letter "a" following.

The vertical members just described are tied together by horizontal members on each side designated by the numerals 5 5a, 6, 6a, 7, 7a, 8, 8a, 9, 9a, 10, 10a, 11, and 11a. As clearly shown in Figures 3 and 4, the horizontal members 9 and 9a are located in a different vertical plane than the other horizontal side members. The vertical and horizontal side members are braced by the cross members 12, 13 and 14 as shown in Figure 1.

Figure 2:
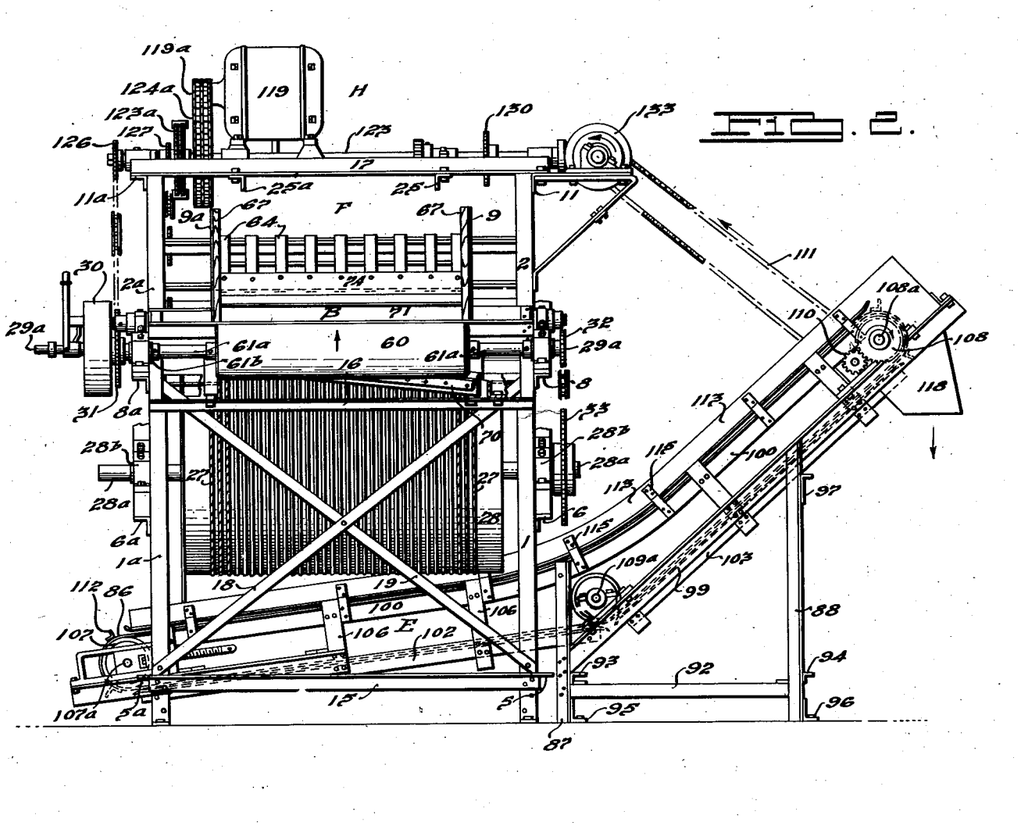
Figure 2 is an elevational view of the delivery end of the machine shown in Figure 1.
Figure 3:
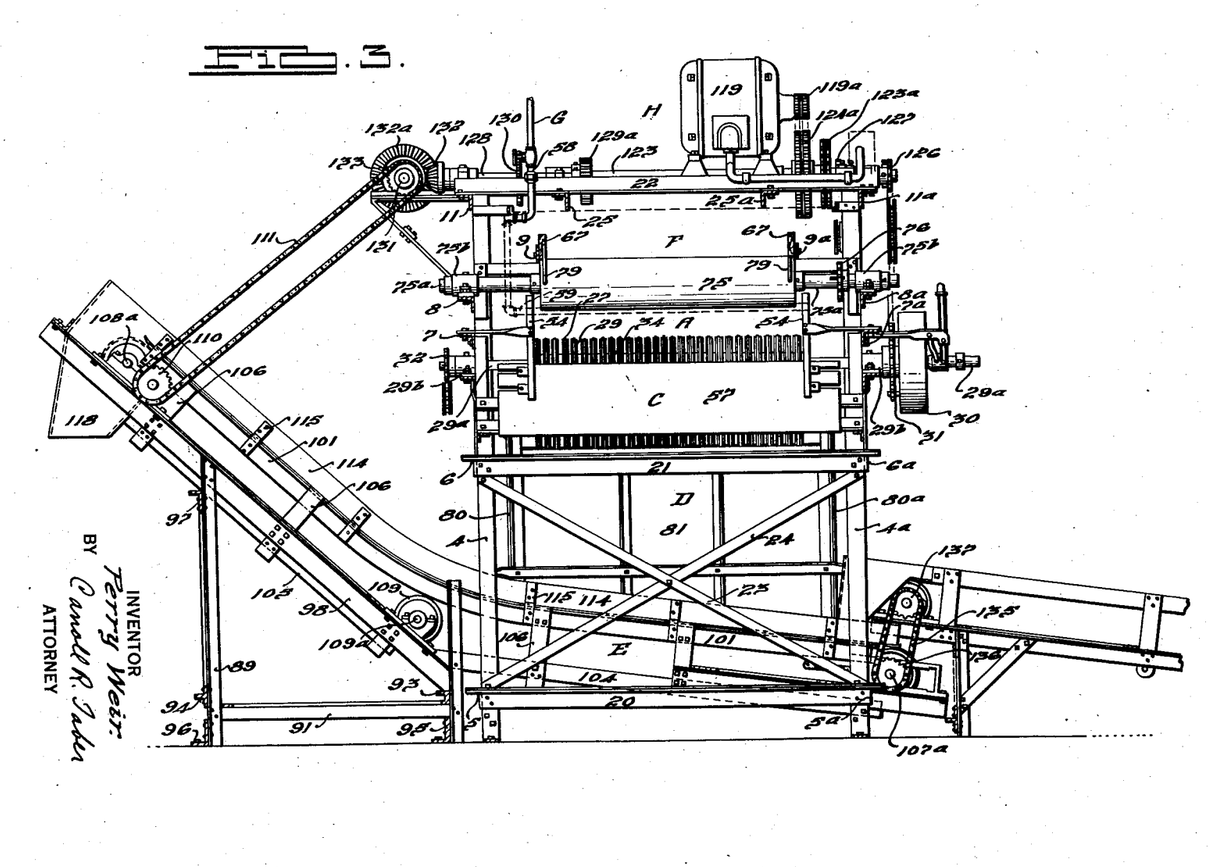
Figure 3 is an elevational view of the discharge end of the machine shown in Figure 1.

The frame construction of the delivery end of the machine is shown in Figure 2. As there shown, the vertical frame members 1 and 1a are joined to each other by horizontal end members 15 and 16 and the cross members 18 and 19. The vertical frame members 2 and 2a are jointed together by horizontal frame member 17. The frame construction at the discharge end of the machine is shown in Figure 3. As there shown, the vertical members 4 and 4a are joined to each other by the horizontal members 20, 21 and 22, and by the cross braces 23 and 24.

Figure 7:
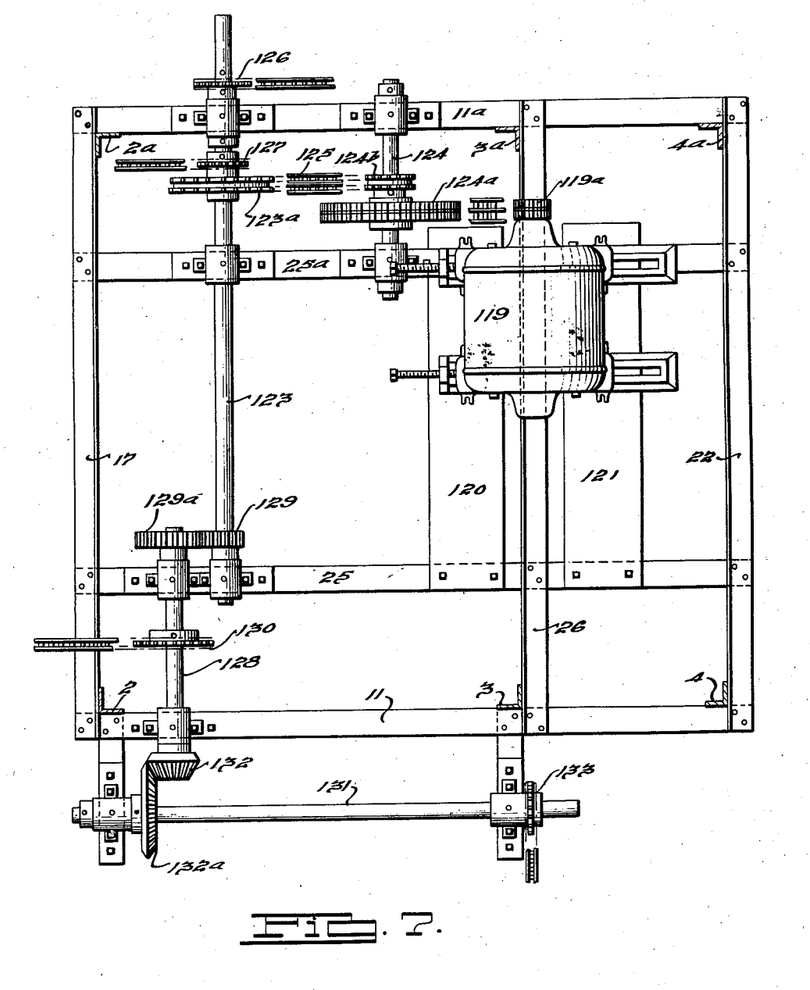
Figure 7 is a top plan view of the drive mechanism for the machine illustrated in Figure 1.

The frame construction at the top of the machine is illustrated in Figure 7. As there shown, the frame includes the longitudinally extending frame members 25 and 25a connected at the opposite ends of the machine to the end members 17 and 22. A laterally extending frame member 26 extends between and is secured to the side members 11 and 11a.

Only the principal frame members have been referred to in the foregoing description. The machine includes other members and, insofar as is necessary, they will be referred to in the description of the other parts of the machine.

The grading section

The grading section is, of course, the heart of the machine, and the present invention relates to the details of construction and arrangement of the various parts of this section as well as the general construction and arrangement of this part of the machine with the other parts of the machine.

The grading section includes a plurality of endless article carrying grading belts 27 of novel construction. The belts are mounted upon the rotatable drum 28 and a plurality of rotatable sheaves 29, each belt being mounted upon a separate sheave. Drum 28 is secured to shaft 28a and sheaves 29 are secured to shaft 29a. Shaft 28a is mounted in bearings 28b secured to frame members 6 and 6a respectively. Shaft 29a is mounted in bearings 29b supported indirectly from frame members 7, 7a, 4 and 4a.

The relative size of drum 28 and sheaves 29 and the relative location of shafts 28a and 29a are such that the endless belts 27 form an upper substantially horizontal grading section inclined upwardly from drum 28 to sheaves 29. That is say, inclined upwardly from the feed end of the grading section to the discharge end of the grading section.

Shaft 29a is provided with a friction clutch construction 30 at one end thereof (see Figure 3) including sprocket 31. Sprocket 31 is driven by a suitable drive chain associated with the drive sprocket carried by one of the drive shafts included in the power drive designated generally at H. Details of this drive will be described presently. Thus, the shaft 29a is driven through the clutch 30 whereby the rotary movement of the shaft may be regulated without interfering with the power drive.

The opposite end of shaft 29a is provided with a drive sprocket 32 and shaft 28a is provided with a drive sprocket 33. Shaft 28a is rotated by means of a conventional form of drive chain associated with sprockets 32 and 33. The relative sizes and character of sprockets 32 and 33 are proportionate with respect to the size of sheaves 29 and drum 28 so that the sheaves and drum are driven at a speed that causes the endless belts 27 to travel at a uniform speed throughout their extent.

Figure 21:
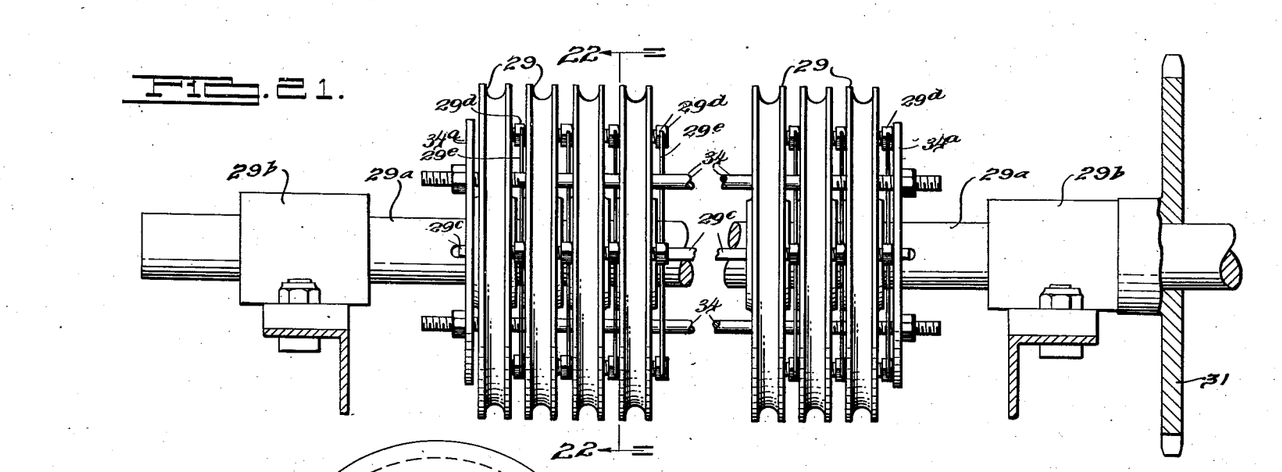
Figures 21 and 22 illustrate the details of construction of and the manner in which the grading belt supporting sheaves are mounted upon their drive shaft.
Figures 22, 23:
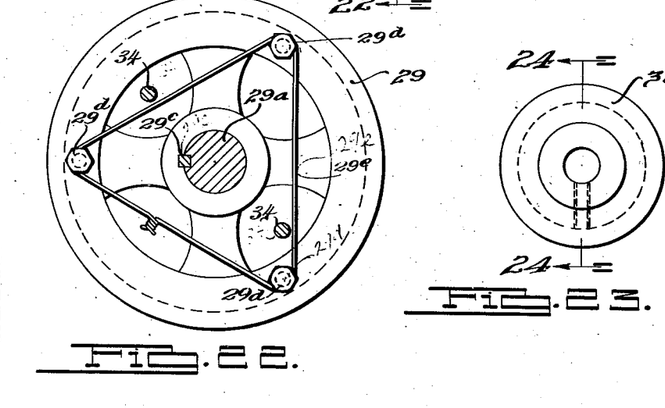
Figures 23 and 24 illustrate the construction of the grading belt guiding sheaves.

The construction of the sheaves 29 and the manner in which they are secured upon shaft 29a, in adjustable spaced relation to each other, is illustrated in Figs. 21 and 22. As there shown the sheaves 29 are keyed upon shaft 29a by keys 29c and are spaced from each other by cap screws 29d.

The sheaves are formed with three spaced screw threaded openings on one side thereof to receive the cap screws. The cap screws may be threaded into such openings, variable distances, the heads of the cap screws contacting the next adjacent sheave to space it from the sheave to which the cap screws are attached.

Means are provided to prevent the acidental maladjustment of the cap screws 29d. This consists in providing radial openings in the heads of the cap screws through which a wire 29e is placed as best shown in Fig. 22. In this manner the cap screws are held in any desired adjustment and may be readjusted by removing the wire 29e.

The sheaves 29 are secured to each other, to prevent longitudinal movement upon shaft 29a, by a pair of rods 34 and a pair of end plates 34a. The rods 34 are positioned between the spoke portions of the sheaves, as shown in Figure 22, and their ends extend through the plates 34a. The ends of the rods are threaded to receive conventional nuts. When the nuts are threaded home upon the rods the sheaves are firmly held in contact with the heads of the cap screws 29d carried by the next adjacent sheave, thus assuring the desired spacing between the sheaves.

Figure 24:
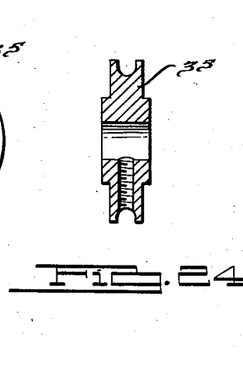

The endless belts 27 are spaced upon drum 28 by means of a plurality of spacing sheaves 35. These sheaves are rotatably mounted upon a shaft 36 and secured upon the shaft in spaced relation to each other by set screws 37. Sheaves 35 are formed, as shown in Figures 23 and 24, with radially extending interiorly threaded openings to receive the set screws 37. Shaft 36 is mounted in bearing brackets 38 which are in turn pivotally mounted upon shafts 39 secured to brackets 39a depending from frame members 8 and 8a. Bearing brackets 38 have their free extremities pivotally connected to adjustable tie rods 40 including the springs 41. The sheaves 35 and the shaft 36 are relatively heavy, and if not counter-balanced would cause the belts 27 to cut into the surface of the drum. Hence, the tie rods 40 and springs 41 provide a resilient counter-balance for partially supporting the weight of the sheaves 35. The counter-balance is adjustable to regulate the pressure of the sheaves 35 on the belts 27.

Through the construction just described it will be apparent that the sheaves 35 are resiliently held adjacent the drum 28 whereby to space the endless belts 27 upon the drum. To further provide for a proper driving connection between the belts and the drum the drum is preferably equipped with an external covering in the form of a rubber sheet or belt lagging 42.

Provision is made for maintaining the belts 27 tightened upon the drum 28 and sheaves 29 through means of the adjustment indicated at 43. This consists of a conventional form of adjustment for varying the distance between shaft 28a and 29a.

Figure 8:
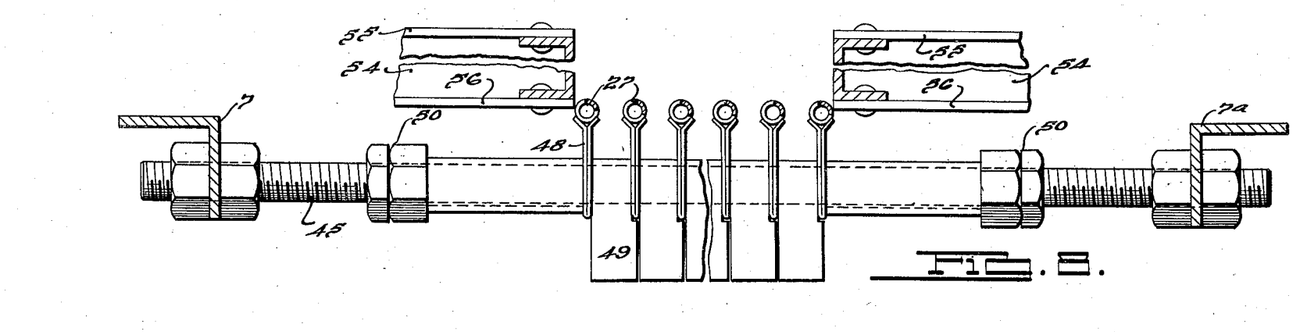
Figure 8 is an enlarged fragmentary view illustrating the manner in which the grading belt guiding tracks are mounted upon the adjustable supports extending transversely of the frame.

Thus far there has been described the means provided for maintaining the endless belts 27 in spaced relation at the opposite ends of the grading section. Provision is also made for maintaining the belts in spaced relation throughout the length of the grading section represented by the inclined upper horizontal travel of the belts. This consists in providing a plurality of guide tracks 48 (see Figures 4, 6, 8 and 12). These guide tracks are mounted upon supports 45 extending transversely of the machine and having their opposite ends secured to horizontal extending frame members 7 and 7a. The tracks are of a novel construction consisting of a strip of metal folded back upon itself longitudinally (see Figure 8) with the lateral edges thereof bent to form a trough. The width of the trough is less than the external diameter of the grading belts 27 in order that the edges of the trough may not interfere with the passage of fruit downwardly between the belts.

Figure 9:
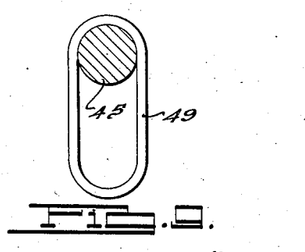
Figure 9 is a fragmentary sectional view illustrating one form of separator used for positioning the tracks upon the adjustable support.
Figure 10:
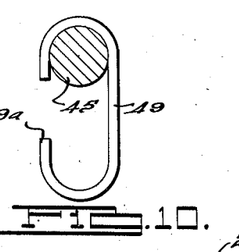
Figure 10 is a fragmentary sectional view illustrating another form of separator for positioning the tracks.
Figure 11:
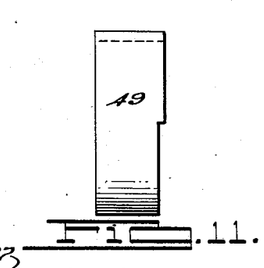
Figure 11 is a side view showing the form of separator illustrated in Figures 9 and 10.
Figure 12:
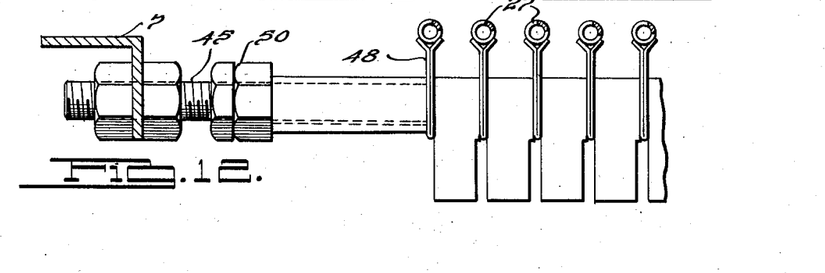
Figure 12 is a view similar to that shown in Figure 8 illustrating an alternative position of the separators.

The tracks 48 are arranged upon the supports 45 in alignment with the sheaves 29 and 35. The spacing of the tracks 48 upon the shafts 45 is accomplished by means of the spacers 49 (see Figure 9). An end view of two forms of the spacers 49 is shown in Figures 9 and 10. A side view of the spacers 49 is shown in Figure 11.

The spacers 49 are in the form of elliptical shaped rings loosely mounted upon shafts 45. The rings may be continuous or provided with an opening 49a as shown in Figure 10. The opening permits the location of the rings upon the support 45 without dismounting the support from frame members 7 and 7a.

The opposite ends of the elliptical spacers 49 are of different widths so that the spacing of tracks 48 may be varied by reversing the position of the spacers upon the supports 45. For example, the narrow ends of spacers 49 are shown in position between the tracks 48 in Figure 8 whereby to effect a corresponding spacing of the belts 27, while in Figure 12 the broader end of each of the spacers 49 is positioned between the tracks to effect a wider spacing of the belts 27.

Thus, the spacing of the tracks may be varied whereby to effect a corresponding variation in the spacing of the belts 27 merely by loosening the lock nuts 50 at the opposite ends of the supports 45 and reversing the position of the spacers 49. By reason of the form of spacer just described, the grading machine may be readily and easily adjusted for the grading of different size fruits.

Figure 13:
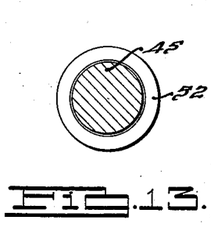
Figures 13 to 16 inclusive illustrate other alternative forms of separators.
Figures 14, 15:
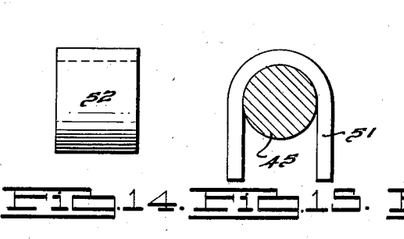
Figure 16:
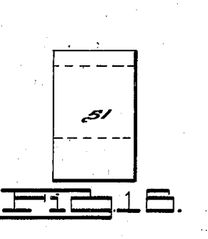

Alternative forms of spacers are shown in Figures 13 to 16. In Figures 15 and 16 there is shown a substantially U-shaped spacer 51 which is of the same width throughout. It may be readily mounted upon the support 45 merely by adjusting the lock nuts 50 and without disconnecting the support from the frame members 7 and 7a. The spacers 52 shown in Figures 13 and 14 are of cylindrical formation and may be mounted upon the supports 45 only by disconnecting the supports from the frame members 7 and 7a.

The spacers 51 and 52 will be used of course only on a machine where it is anticipated that the machine will be used continuously for effecting the same character of grading, the spacers 49 being used where it is desired to change the machine to adapt it for effecting different gradings of fruit. Regardless of the kind of spacer that is used, the spacers and tracks are locked in position by the lock nut 50 having interposed between it and the adjacent track an elongated cylindrical spacer 53 mounted upon support 45.

As previously mentioned, the tracks 49 are mounted in alignment with the large sheaves 29 and the small guiding sheaves 35 associated with drum 28. Of course, the spacing of the sheaves will be correspondingly changed when the spacing of the guide tracks 48 is changed as just described. To that end the spacers 34 and 37 may be of the same character as those used between the tracks 48. In every case the sheaves 29 and 35 and the tracks 48 support and space the belts 27 to provide a substantially horizontal grading section inclined upwardly from the delivery end of the grading section to the discharge end.

Figure 4:
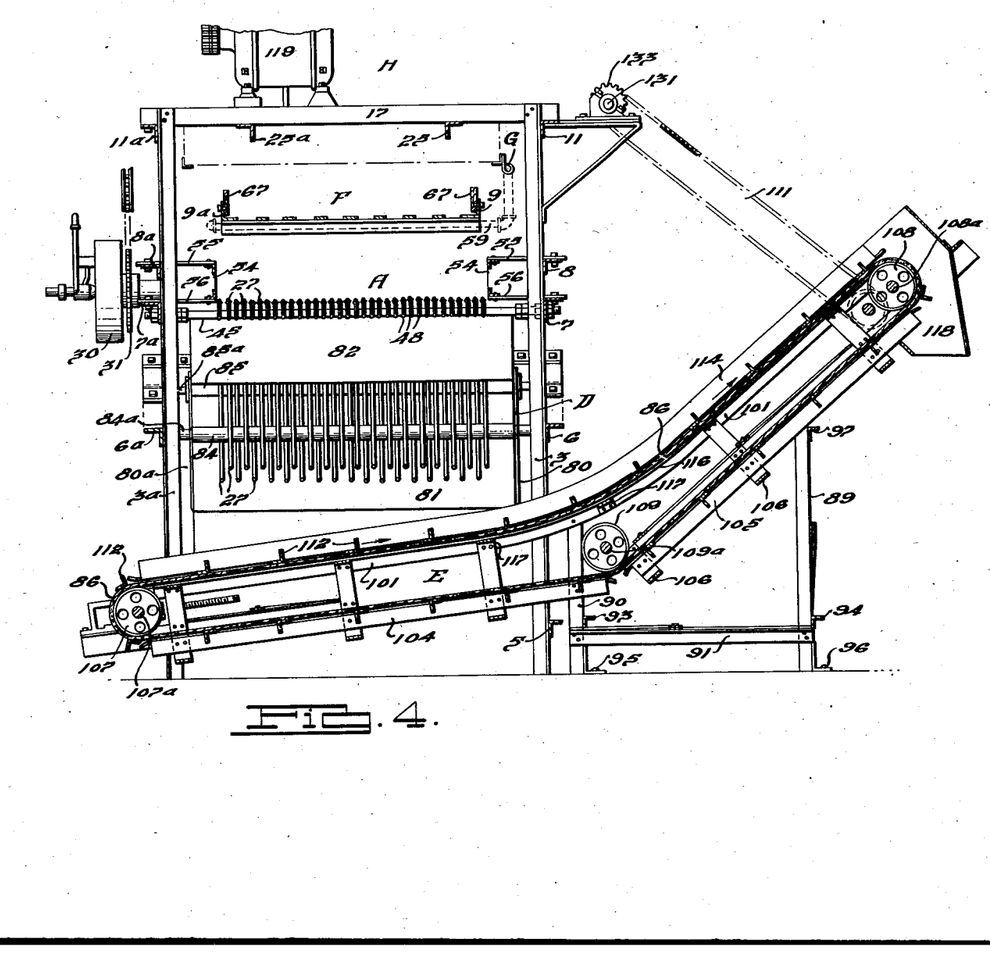
Figure 4 is a sectional view taken on substantially the line 4—4 of Figure 1.
Figure 5:
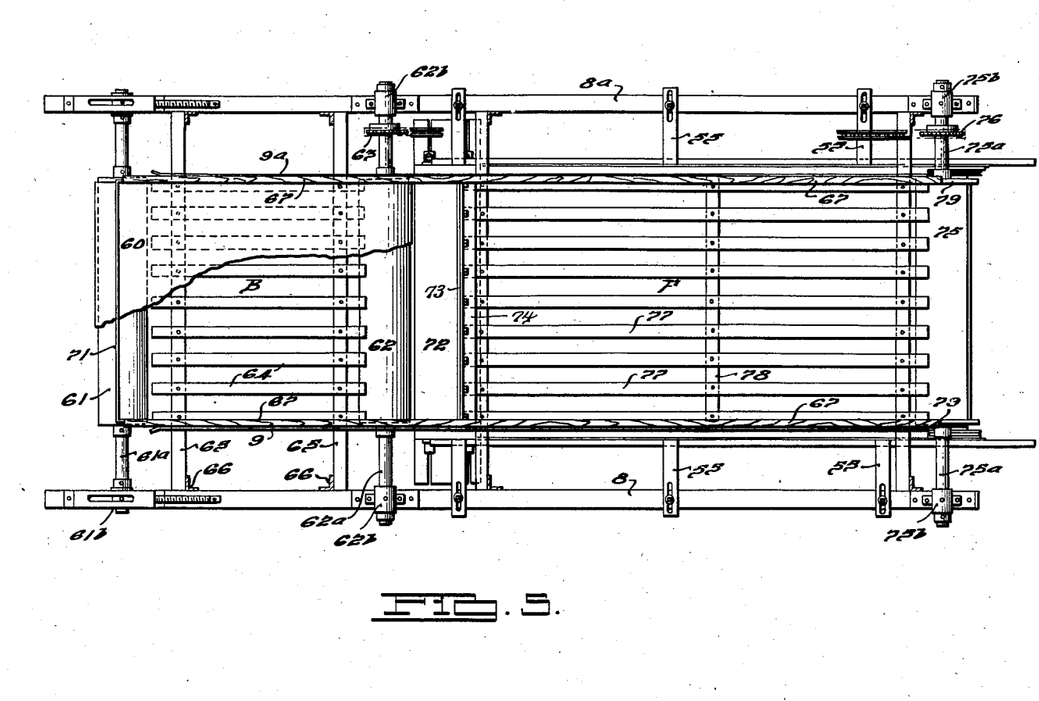
Figure 5 is a sectional view taken on substantially the line 5—5 of Figure 1.
Figure 6:
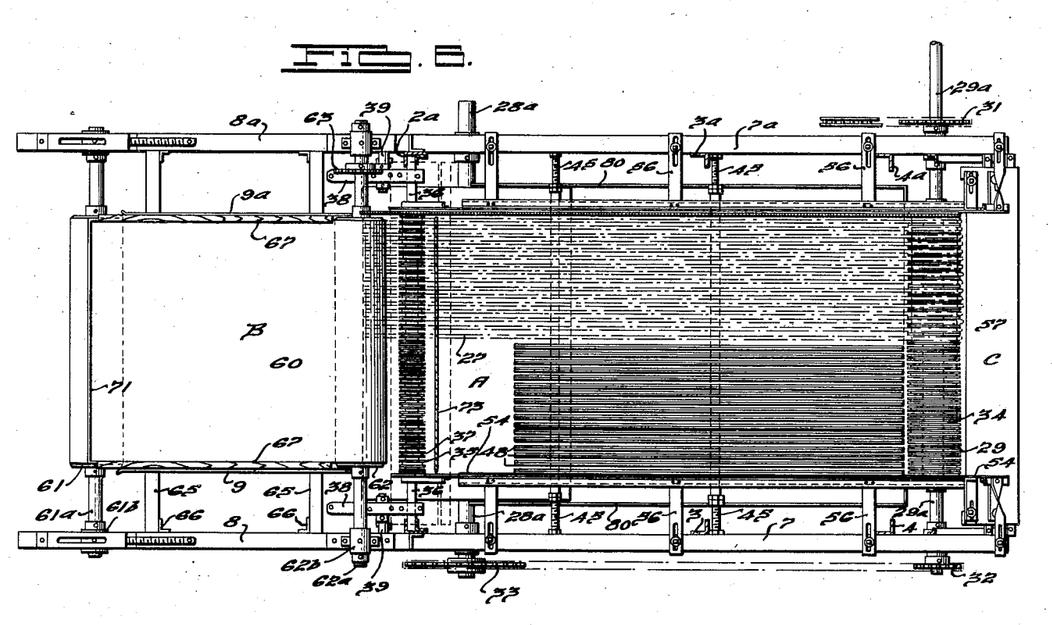
Figure 6 is a sectional view taken on substantially the line 6—6 of Figure 1.

As best shown in Figure 4, metal side rails 54 are arranged at the opposite sides of the grading belts 27 throughout the entire extent of the grading section proper. These sides rails are mounted upon horizontal supports 55 and 56, the supports 55 being adjustably secured to side frame members 8 and 8a, and the supports 56 being adjustably secured to side frame members 7 and 7a. The supports are made adjustable in order to vary the distance between the side rails 54 to accommodate the same to the overall width of the grading section resulting from the changes in the spacing of tracks 48.

Adjacent the discharge end of the grading section the tracks 54 are curved downwardly, as clearly shown in Figures 1 and 3. A discharge hopper 57 is secured to the curved ends of the side rails 54. The graded fruit is delivered from the grading belts 27 at the discharge end thereof to the hopper 57 from whence the fruit is delivered to any suitable receptacle or conveyor belt.

Through means of the sprinkler system indicated generally by the letter G the graded fruit is washed as it is carried along by the grading belts 27. The sprinkler system includes the inlet pipe 58 connected to a source of water supply, and the discharge connections 59 extending transversely of the grading section. The connections 59 are in the form of perforated pipes whereby water is discharged upon the fruit as it passes along the grading section.

The detailed construction of the grading belts 27 is shown in Figures 16 to 19 inclusive. As indicated by these figures the belts are in the form of coiled wire springs having their free ends secured to each other to form endless belts.

Figure 17:
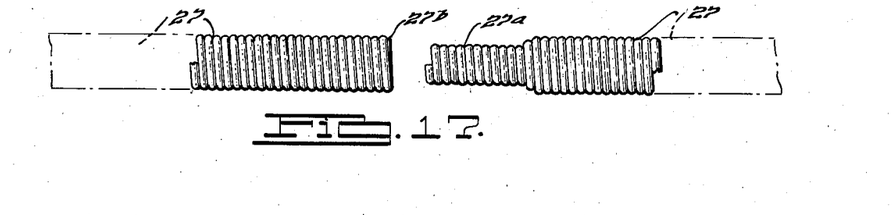
Figures 17 to 20 inclusive illustrate the form of grading belt employed and the manner in which the free ends thereof are joined together.

A novel method of securing the free ends of the belts to each other is employed. This consists in reducing one end section 27a as indicated in Figure 16 and flattening a part of the last coil of the other end as indicated at 27b also in Figure 16. The reduced end section 27a is then threaded into the end adjacent the flattened coil 27b as indicated at Figure 17. The section 27a is reduced to such diameter that it will engage between the coils of the other end when it is threaded into the latter end.

Figure 18:
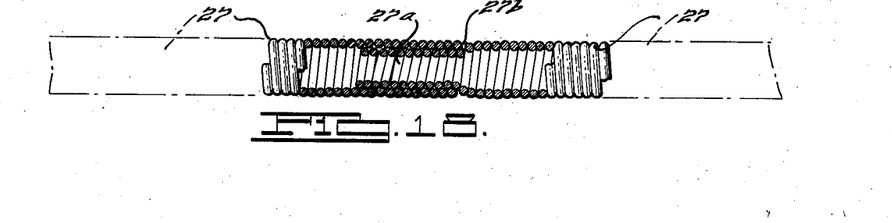
Figure 19:
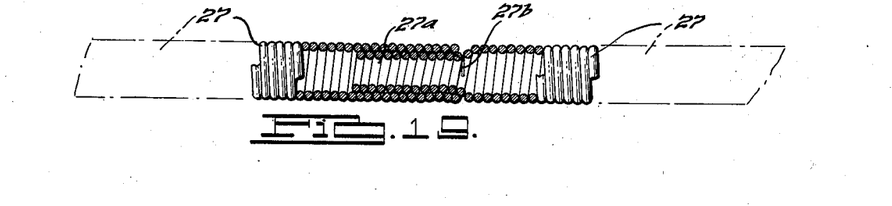
Figure 20:
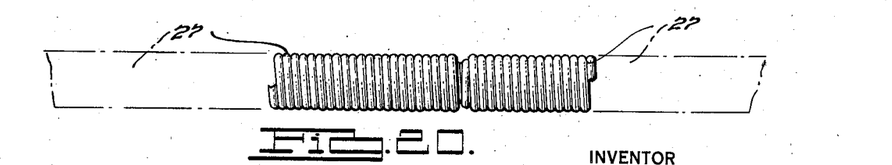

After the reduced section 27a has been threaded into the opposite end of the coil spring belt the flattened coil 27b is pressed between the coils of the reduced section 27a as indicated at Figure 18, thus placing both ends of the wire from which the coil belt is formed within the coils of the belt.

The method of securing the ends of the belt together just described provides an effective attachment for the ends without destroying the flexibility of the belt whereby to interfere with its smooth passage over the drum 28 and sheaves 29.

The coil spring belts 27 form an ideal article carrying belt because they have an inherent resiliency which permits mounting the same upon the drum 28 and the sheaves 29 whereby to assure a proper driving engagement between the belts and these parts. Likewise, the coils of the belt cause the fruit on the grading section to be rolled around sufficiently to assure that all of the cull fruit will fall between the grading belts and that only the fruit of the desired size will be carried to the graded fruit discharge hopper 57.

*Delivery and by-pass sections*

The delivery and by-pass sections are indicated generally by the letters B and F respectively.

The fruit to be graded is delivered to the grading section A by a delivery belt 60 mounted upon rotatable drums 61 and 62. Drum 61 is secured to shaft 61a which is mounted in bearings 61b secured to side frame members 8 and 8a. Drum 62 is secured to shaft 62a which is mounted in bearings 62b also secured to side frame members 8 and 8a. Delivery belt 60 is an endless belt encircling drums 61 and 62. The belt is driven by drum 62, there being associated with shaft 62a a sprocket 63 driven by suitable drive chain connection from one of the drive shafts included in the power drive designated generally at H. Provision is made for maintaining the belt 60 in driving engagement with the drums through means of the adjustment indicated at 64 whereby the distance between the shafts 61a and 62a may be varied.

It will be observed that shafts 61a and 62a are arranged so that the upper surface of the delivery belt 60 extends in a substantially horizontal direction, being inclined upwardly from drum 61 to drum 62. This upper horizontal section of belt 60 is supported by a plurality of longitudinally extending supporting slats 64 mounted upon the transversely extending angle iron supports 65 (see Figure 5). Supports 65 are secured at their opposite extremities to vertical supports 66 connected to side frame members 8 and 8a. The members 65 are also connected to the frame members 9 and 9a.

Wooden side rails 67 are provided for the delivery belt 60. They are secured to the frame members 9 and 9a. The side rails are spaced slightly above the horizontally extending portion of frame members 9 and 9a whereby to provide a slot or recess to receive the edge of delivery belt 60 throughout its upper horizontal extent. The side rails thus serve to guide the delivery belt and and to prevent fruit carried by the delivery belt from falling off the sides thereof.

The power portion of the delivery belt is guided by vertical rollers 68 mounted between cross frame members 65 and cross frame members 69 arranged in spaced parallel relation to members 65. The members 69, as in the case of members 65, are secured to the vertical support 66.

Provision is made for keeping delivery belt 60 cleaned of crushed fruit or debris in the form of a belt wiper 70 (see Figures 1 and 2) extending from vertical support 66 adjacent delivery belt drum 61 to the vertical support 66 at the opposite side of the machine adjacent delivery belt drum 62.

The fruit to be graded is delivered to delivery belt 60 adjacent the drum 61 by any suitable form of elevator or hopper arrangement. To prevent the fruit thus delivered to the delivery belt from falling off the end of the belt there is provided at the end of the belt a stop 71 secured to the guide rails 67.

Fruit is delivered from the discharge end of the delivery belt 60 adjacent drum 62 to the upper horizontal section of grading belts 67 through a hopper 72. Hopper 72 extends in a downwardly inclined direction from the delivery belt 60 to the grading belts 27 and is secured to the grading belt side rails 54. In order to distribute the fruit evenly over the grading belts 27 there is provided intermediate the extremities of hopper 72 a depending distributor apron 73 (see Figures 1, 2, 5 and 6). Apron 73 is secured to an angle iron 74 extending between and connected to frame members 9 and 9a. The apron extends downwardly from the angle iron 74 with its lower free end contacting the surface of hopper 72.

Provision is made for by-passing the ungraded fruit over the grading section A to prevent interruption of the operation of other machines associated with the grading machine for continuously handling the fruit. This consists in the provision of a rotatable drum 75 secured to shaft 75a mounted in bearing 75b secured to side frame members 8 and 8a (see Figures 1, 3 and 5). Drum 75 is adapted to cooperate with drums 61 and 62 to support an enlarged delivery belt to be substituted for delivery belt 60. When the drum 75 is utilized for this purpose the delivery belt is driven from shaft 75a rather than from shaft 62a as when delivery belt 60 is used. To effect the change in the drive the same drive shaft is utilized and a chain drive effected with sprocket 76 carried by shaft 75a instead of the sprocket 63 carried by shaft 62a.

Provision is made for supporting the upper horizontal surface of the enlarged belt extending over drum 75 similar to the support provided for delivery belt 60. This support consists of a plurality of longitudinally extending laterally spaced slats 77 secured to cross supports 78 having their opposite extremities connected to frame members 9 and 9a. Side rails, 67 previously described in connection with delivery belt 60, extend throughout the length of the machine and serve as side rails and guides for the enlarged belt used over drum 75 when the fruit is by-passed over the grading section. Adjacent the discharge end of the machine there is secured to the side rails 67 curved metal extensions 79 which serve to direct the fruit by-passed over the grading section to the graded fruit discharge hopper 57.

Thus, if desired, the ungraded fruit may be passed over the grading section A without being graded and delivered to the graded fruit discharge hopper 57 by means of an extension of the delivery belt 60. Accordingly, repairs and adjustments may be made to the grading section without interrupting continuous flow of fruit through the machines. This is of vital importance because the machine is intended for use in a plant where the fruit is conveyed continuously from storage hoppers through a plurality of grading, cooking and packing machines, and the like. Consequently, a break down in one machine which interferes with the continuous flow of the fruit ties up all the other machines. Where a break down occurs or adjustments are necessary in the grading section A of the grading machine embodying the present invention, the fruit may be by-passed over the grading section and passed through the other associated machines for other operations resulting only in a change in the ultimate grade of fruit.

*Cull hopper and conveyor sections*

As previously mentioned, the upper horizontal section of grading belts 27 are spaced to permit fruit of small or cull size to fall between the belts, the tracks being of such construction that they do not interfere with the passage of the cull fruit between the belts. The cull fruit thus falling between the belts falls into the hopper indicated generally by the letter D. The construction of the hopper is best shown in Figures 1, 3, 4 and 6.

The hopper is made up of side walls 80 and 80a, discharge end wall sections 81 and 82 separated from each other as best shown in Figures 1, 3 and 4 to permit the passage therethrough of grading belts 27 in their lower horizontal section, and a delivery end section 83. In order to permit the cull fruit which drops from the upper horizontal section of grading belts 27 to pass between the belts 27 in the lower horizontal section, the belts in the lower section are arranged in staggered relation as indicated in Figure 1. As there shown, alternate belts go over and under an idler roller 84 mounted upon a shaft 84a extending through the side walls 80 of the hopper. At the junction between the discharge end sections 81 and 82 of the hopper the belts 67 pass over an idler pulley 85. This pulley is mounted upon shaft 85a which extends through the sides 80 of the hopper.

The cull conveyer E is associated with the bottom or discharge end of hopper D. The cull conveyor includes an endless conveyor belt 86 mounted for rotation in a conveyor belt housing. The housing is supported by the frame members of the grading machine proper and the auxiliary frame members shown in Figures 2, 3 and 4. As there shown, the auxiliary frame members include the uprights 87, 88, 89 and 90, the horizontal members 91, 92, 93, 94, 95, 96 and 97, and the inclined members 98 and 99.

The conveyor housing includes the upper curved angle iron sections 100 and 101, and the lower angle iron sections 102, 103, 104 and 105. The angle iron sections 100 to 105 inclusive are secured to each other by U-shaped yokes 106, which hold the angle irons in spaced relation to each other as shown. The conveyor housing is, of course, mounted upon the main frame and auxiliary frame members previously described. As clearly shown, the discharge end of the housing is elevated for a purpose which will appear presently.

Conveyor belt 86 is mounted upon drums 107 and 108 located at the opposite ends of the conveyor housing. These drums are mounted upon rotatable shafts 107a and 108a respectively, which in turn are supported by bearings attached to the housing. In order to maintain the belt in proper position intermediate the ends of the housing adjacent the curved portion thereof there is provided an idler drum 109 mounted upon shaft 109a, also carried by the housing. The belt 86 is driven by drum 108 through means of an operative connection with sprocket 110 driven by roller chain 111 associated with one of the drive shafts of power drive H.

Conveyor belt 86 is provided at spaced intervals with elevator flights 112 in the form of angle irons extending transversely thereof and riveted thereto. The upper portion of the conveyor housing is provided with curved side rails 113 and 114 secured to the angle irons 100 and 101 respectively by brackets 115. The angle irons 100 and 101 form with the side rails 113 and 114 a slot which receives the marginal edges of elevator flights 112 to guide the conveyor belt. The upper horizontal section of belt 86 is supported upon supporting slats 116 secured to cross braces 117. These cross braces are attached to yokes 106. In the lower horizontal travel of the conveyor belt 60 the edges of the elevator flights 112 ride upon the laterally extending portions of angle irons 102, 103, 104 and 105, whereby to support and guide that section of the conveyor belt.

Adjacent the discharge end of the conveyor housing there is provided a discharge hopper 118 into which the cull fruit is delivered by the conveyor belt 86. The discharge hopper is preferably of sufficient height to deliver the cull fruit from one machine onto the delivery belt 60 of an adjacent machine whereby the cull fruit from the first machine may be further graded by the adjacent machine.

In Figure 3 there is shown an arrangement whereby a cull conveyor associated with an adjacent machine delivers the culls from that machine to the intake end of the conveyor belt 86 of the cull conveyor just described. In this manner the culls from any number of machines may be accumulated and ultimately discharged from the cull hopper 118 upon the delivery belt 60 of another grading machine for additional grading operations, or the culls may all be delivered to a suitable cull receptacle or the like.

The connecting cull conveyor shown in Figure 3 is of the same general construction as the cull conveyor E shown in that figure. Its conveyor belt may be driven through an auxiliary drive chain 135 associated with a sprocket 136 secured to shaft 107a and a corresponding sprocket 137 associated with the shaft 138 upon which is mounted a conveyor belt driving drum for the connecting conveyor.

Power drive

The source of power for the grading machine consists of an electric motor 119 supported by wood frame members 120 and 121 having their opposite extremities secured to the frame members 25 and 25a. Electric current is delivered to motor 119 from any conventional source of supply through cable 122.

The main drive shaft 123 for the machine is driven by motor 119 through intermediate shaft 124 which is connected to the motor shaft by a silent chain drive associated with the drive wheels 119a and 124a. The intermediate drive shaft 124 is connected to the main drive shaft 123 by a double roller chain 125 associated with sprockets 124b and 123a. Main drive shaft 123 is provided with a drive sprocket 126 which is operatively connected with the sheave drive sprocket 31 through a suitable drive chain not shown. The main drive shaft is also provided with a drive sprocket 127 which is associated with delivery belt sprocket 63 on shaft 62a through means of a suitable drive belt.

An auxiliary drive shaft 128 is driven by main drive shaft 123 through means of the reduction gears 129 and 129a. Auxiliary drive shaft 128 is provided with a drive sprocket 130 utilized for driving an elevator or the like not shown for feeding ungraded fruit to the delivery belt 60.

A second auxiliary drive shaft 131 is driven by auxiliary shaft 128 through the reduction gears 132 and 132a. A sprocket 133 is carried by auxiliary drive shaft 131. Drive chain 111 utilized for driving the cull conveyor belt is connected to sprocket 133.

The power drive may be summarized as follows: Conveyor belt 60 is driven by means of a drive chain associated with driving sprocket 127 on drive shaft 123 and driven sprocket 63 mounted on shaft 62a. The grading belts 27 are driven by means of a suitable drive chain associated with driving sprocket 126 mounted on drive shaft 123 and driven sprocket 121 mounted upon sheave shaft 29a. The drum shaft 28a is driven from the sheave shaft 29a through a chain associated with sprocket 32 mounted on shaft 29a and sprocket 33 mounted on shaft 28a. The cull conveyor belt 86 is driven by chain 111 associated with driving sprocket 133 on drive shaft 131 and driven sprocket 110 associated with drum shaft 108a.

Résumé

The operation of the machine embodying the present invention has been set forth in connection with the foregoing description of the various parts of the machine. Such operation may be summarized as follows:

Fruit to be graded is delivered to delivery belt 60 by any desired form of delivery means, such as an elevator, or such as the cull conveyor discharge hopper 118 of an associated machine. Conveyor belt 60 delivers the fruit to the brading belts 27 through means of the transfer hopper 72. Provision is made in connection with the transfer hopper 72 for distributing the fruit laterally over the grading belts 27. This consists of a section of loosely suspended belting against which the fruit must strike in passing from the delivery belt 60 to the grading belts 27.

The grading belts, due to the inclination of the upper horizontal section thereof, agitate the fruit while carrying it from the delivery end of the grading section to the discharge hopper 57. Such agitation causes the fruit which is of small enough diameter to pass between the spaced grading belts 27 to fall between the belts into the cull hopper indicated by the letter D. The graded fruit delivered to hopper 57 is discharged by the hopper into any suitable receptacle or upon any suitable conveyor belt for transmitting the same to an adjacent machine for additional operations.

The cull fruit discharged into the cull hopper D passes from the hopper onto the cull conveyor belt 86 and is carried by that belt with the aid of the elevator flights 112 to the cull conveyor discharge hopper 118. This hopper 118 is adapted to deliver the fruit to the delivery belt 60 of an adjacent machine for further grading.

The ungraded fruit may be by-passed over the grading section A if desired by substituting an enlarged delivery belt for delivery belt 60 and mounting the same upon drums 61, 62 and 75 in place of upon drums 61 and 62. Such enlarged delivery belt then delivers the fruit directly from the delivery end of the machine to the graded fruit hopper 57.

While a preferred and actually operative embodiment of the invention has been shown and described, it should be understood that the invention is not limited to such structure, but that it is co-extensive with the scope of the appended claims.

I claim:

1. A grading machine including, in combination, a rotatable cylindrical drum, a plurality of rotatable sheaves mounted upon a shaft arranged in parallel spaced relation to the axis of the drum, a plurality of endless belts mounted upon the drum and sheaves with each belt engaging a separate sheave, the sheaves being spaced from each other a pre-determined distance, and means spaced from the drum and engaging the belts for spacing the belts upon the drum a predetermined distance from each other, said means being adjustable axially of the drum whereby to vary the spacing of the belts upon the drum.

2. A grading machine including, in combination, a rotatable cylindrical drum, a plurality of rotatable sheaves mounted upon a shaft arranged in parallel spaced relation to the axis of the drum, a plurality of endless belts mounted upon the drum and sheaves with each belt engaging a separate sheave, the sheaves being spaced from each other a pre-determined distance, a plurality of additional sheaves mounted upon a shaft arranged in closely spaced parallel relation to the drum, said sheaves engaging the endless belts and being adjustable axially of the shaft to vary the spacing of the belts upon the drum, and means for holding the sheaves in adjusted position.

3. In a grading machine including a plurality of tracks for supporting article carrying belts loosely mounted upon transverse supports, spreaders for spacing the tracks from each other comprising substantially elliptical shaped rings loosely mounted upon the supports between the tracks, the opposite ends of said rings being of different width to permit a variation in the spacing of the tracks by reversing the position of the spreaders upon the supports.

4. In a grading machine including a plurality of tracks for supporting article carrying belts loosely mounted upon transverse supports, spreaders also loosely mounted upon the supports between the tracks for spacing the tracks comprising elliptical shaped non-continuous rings having an opening intermediate their ends of a size permitting the mounting of the spreaders upon the supports while the tracks are in place on the supports.

5. In a grading machine including a plurality of tracks for supporting article carrying belts loosely mounted upon transverse supports, spreaders also loosely mounted upon the supports between the tracks for spacing the tracks comprising elliptical shaped non-continuous rings having an opening intermediate their ends permitting the mounting of the spreaders upon the supports, the opposite ends of said rings being of different width to provide for different spacing of the tracks by reversing the position of the spreaders.

6. A grading machine including, in combination, a rotatable drum, a plurality of rotatable sheaves mounted upon a shaft arranged in parallel spaced relation to the axis of the drum, a plurality of endless belts mounted upon the drum and sheaves with each belt engaging a separate sheave, and means for maintaining the grading belts in predetermined spaced relation to each other comprising spacers between said sheaves, a second set of sheaves arranged adjacent the periphery of the rotatable drum each sheave being adapted to engage one of the belts, and a plurality of spaced tracks extending between the drum and the first mentioned sheaves, said tracks being arranged in alignment with the belt supporting sheaves and the sheaves positioned adjacent the periphery of the rotatable drum.

7. In a grading machine, a rotatable shaft, a plurality of grading belt supporting sheaves keyed upon the shaft and movable longitudinally thereof, adjustable spacers secured to the sheaves to space each sheave from the next adjacent sheave, separate means for locking the spacers in predetermined position, and means for clamping the sheaves together.

8. A grading machine including, in combination, a rotatable cylindrical drum, a plurality of endless belts mounted upon the drum, and means for spacing the belts axially of the drum comprising a plurality of sheaves arranged parallel with the drum and movable radially with respect thereto, the said belts passing between the sheaves and the drum with each sheave engaging a side of a belt opposite the side thereof engaged by the drum whereby the belts are gripped between the sheaves and the drum.

9. A grading machine including, in combination, a rotatable drum, a plurality of endless belts mounted upon the drum, and means for spacing the belts axially of the drum comprising a plurality of sheaves arranged parallel with the drum and movable radially with respect thereto, the said belts passing between the sheaves and the drum with each sheave engaging a belt whereby the belts are gripped between the sheaves and the drum, and resilient counterbalancing means for partially supporting the sheaves.

10. A grading machine including, in combination, a frame provided with a plurality of spaced transverse supporting members, a rotatable drum mounted upon the frame, a plurality of rotatable sheaves mounted upon a shaft carried by the frame and arranged in parallel spaced relation to the axis of the drum, a plurality of endless belts mounted upon the drum and sheaves with each belt engaging a separate sheave, adjustable spacers secured to the sheaves to space each sheave from the next adjacent sheave, means for clamping the sheaves together, means cooperating with the drum for spacing each of the belts upon the drum the same predetermined distance from each other, a plurality of belt supporting and guiding tracks extending longitudinally of the frame and loosely mounted upon said transverse supporting members, means for spacing the tracks laterally from each other comprising removable spreaders loosely mounted upon the transverse supporting members, said spreaders being formed to effect a plurality of different spacings of the tracks by varying the position of the spreaders upon the supports.

11. In a grading machine, a rotatable shaft, a plurality of grading belt supporting sheaves keyed upon the shaft and movable longitudinally thereof, screw threaded means secured to the sheaves to space each sheave from the next adjacent sheave, and means for clamping the sheaves together.

12. In a grading machine, a rotatable shaft, a plurality of grading belt supporting sheaves mounted upon the shaft to be movable longitudinally thereof, adjustable spacers secured to the sheaves to space each sheave from the next adjacent sheave, a pair of locking plates arranged upon the shaft with all the sheaves positioned therebetween, a plurality of rods extending through the sheaves and the locking plates, and means associated with the ends of the rods for urging the locking plates toward each other.

PERRY WEIR.